(12) United States Patent
Kumasawa et al.

(10) Patent No.: US 7,719,762 B2
(45) Date of Patent: May 18, 2010

(54) TRANSMITTING-REFLECTING PROJECTION SCREEN, AND PROJECTION SYSTEM COMPRISING THE SAME

(75) Inventors: Tomoko Kumasawa, Tokyo-To (JP); Masanori Umeya, Tokyo-To (JP); Masachika Watanabe, Tokyo-To (JP); Tsuyoshi Yamauchi, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 873 days.

(21) Appl. No.: 11/333,257

(22) Filed: Jan. 18, 2006

(65) Prior Publication Data

US 2006/0181769 A1   Aug. 17, 2006

(30) Foreign Application Priority Data

Jan. 21, 2005  (JP)  ............................. 2005-014375
Nov. 18, 2005  (JP)  ............................. 2005-334257

(51) Int. Cl.
*G03B 21/56* (2006.01)
(52) U.S. Cl. ...................................... 359/449; 359/460
(58) Field of Classification Search ................ 359/443, 359/449, 459, 460
See application file for complete search history.

(56) References Cited

U.S. PATENT DOCUMENTS 4,340,274 A * 7/1982 Spooner ...................... 359/455
5,993,006 A * 11/1999 Takeuchi et al. .............. 353/30
6,323,999 B1 * 11/2001 Ueda et al. .................. 359/443
6,381,068 B1 * 4/2002 Harada et al. ............... 359/443
6,414,727 B1 * 7/2002 Benton ........................ 348/744
6,639,719 B2 * 10/2003 Tegreene et al. ............ 359/443
6,643,039 B1 * 11/2003 Sato et al. .................... 359/15
6,952,295 B2 * 10/2005 Suzuki et al. ................. 359/15
6,992,822 B2 * 1/2006 Ma et al. ..................... 359/487
7,123,409 B2 * 10/2006 Umeya ........................ 359/449
7,234,817 B2 * 6/2007 Paukshto ..................... 353/20
7,286,101 B2 * 10/2007 Hosaka ....................... 345/1.2
7,324,277 B2 * 1/2008 Choi .......................... 359/452

FOREIGN PATENT DOCUMENTS

JP   A 09-222512      8/1997
JP      3482963 B2   10/2003
JP   A 2005-003823    1/2005
JP   A 2005-156690    6/2005

* cited by examiner

*Primary Examiner*—Christopher Mahoney
(74) *Attorney, Agent, or Firm*—Oliff & Berridge, PLC

(57) ABSTRACT

The present invention provides a see-through transmitting-reflecting projection screen excellent in transparency, capable of sharply displaying, on its both sides, identical or different images even under bright environmental light.

A transmitting-reflecting projection screen 10 comprises a reflection-type screen 11 and a transmission-type screen 12. The reflection-type screen 11 reflects a specific polarized component of imaging light projected. The reflection-type screen 11 does not reflect a polarized component, different from the specific polarized component, of the imaging light, and this polarized component passes through the reflection-type screen 11 and the transmission-type screen 12.

14 Claims, 5 Drawing Sheets

TRANSMITTING-REFLECTING PROJECTION SCREEN, AND PROJECTION SYSTEM COMPRISING THE SAME

FIELD OF THE INVENTION

The present invention relates to a projection system in which imaging light is projected, from a projector, on a projection screen to display thereon an image, and, more particularly, to a see-through transmitting-reflecting projection screen excellent in transparency, capable of sharply displaying images on its both sides by reflecting and transmitting imaging light projected, and to a projection system comprising such a projection screen.

BACKGROUND ART

A conventional projection system is usually as follows: imaging light emitted from a projector is projected on a projection screen, and viewers observe the light reflected from the projection screen as an image. Specific examples of projection screens for use in such conventional projection systems include white-colored paper or cloth materials, and plastic films coated with ink that scatters white light. Besides, higher-quality projection screens that comprise scattering layers containing beads, pearlescent pigments, or the like and control the scattering of imaging light by the scattering layers are now commercially available.

The above-described projection screens are usually so made that the scenes behind the projection screens cannot be seen through them to provide higher-contrast images. There are, however, some uses that demand transparent projection screens through which the scenes behind them can be seen. Specifically, for example, in the case where a projection screen is attached to a show window or the like, calculating upon an eye-catching effect, it is necessary that the scene behind the show window can be seen through the projection screen at the time when no image is displayed on the projection screen. There is, therefore, a demand for a transparent projection screen that can display an image with high visibility and through which the scene behind it can be seen.

Since such a transparent projection screen is required to be highly transparent at the time when no image is displayed and also to achieve excellent image display even under bright environmental light, a screen using a hologram (holographic screen) is widely used as the transparent projection screen. Holographic screens are suitable for use in shops with show windows as described above, as well as places of entertainment or exhibition, and so forth.

In addition to commonly used transmission-type screens (screens in which imaging light, as transmitted light, is observed from rear side), reflection-type screens (screens in which imaging light, as reflected light, is observed from front side) have been proposed for the above-described holographic screens (Japanese Patent Laid-Open Publication No. 222512/1997). However, these holographic screens, whether they are of transmission type or of reflection type, are supposed to be viewed only from one side. That is to say, viewing imaging light from both sides of a screen is, in general, beyond our conception.

Japanese Patent Publication No. 3482963 discloses a transmission-type holographic screen from whose both sides imaging light can be viewed when combined with a half mirror. However, although the screen described in this patent document can thus display images on its both sides, the viewable images are merely identical ones, and it is theoretically impossible to display on the screen two different images, one on each side of the screen.

Even in the above-described transmission- or reflection-type holographic screens, it is possible to display on the screen two images, one on each side of the screen, if two imaging light beams are simultaneously projected on the screen from the front and the rear at different angles. In this case, when the two imaging light beams that are projected on the screen from the front and the rear are made to carry different images, it is possible to display on the screen two different images, one on each side of the screen. However, in this case, it is necessary to place two projectors on the respective sides of the screen. Moreover, it is necessary to conduct positioning of the projectors and the screen, and also to make the timing of displaying an image on one side of the screen coincide with the timing of displaying another image on the other side of the screen. The simultaneous projection of two imaging light beams is thus disadvantageous in that the practical installing operation is considerably complicated.

Besides, there exists the following problem with holographic screens themselves: since holograms have wavelength selectivity but no polarized-light selectivity, they cannot separate imaging light from environmental light, which makes it difficult to sharply display images on holographic screens under bright environmental light.

SUMMARY OF THE INVENTION

The present invention was accomplished in the light of the above-described problems. An object of the present invention is, therefore, to provide a see-through transmitting-reflecting projection screen excellent in transparency, capable of sharply displaying, on its both sides, identical or different images even under bright environmental light. A further object of the present invention is to provide a projection system comprising such a projection screen.

The present invention provides, as a first means of fulfilling the object of the invention, a transmitting-reflecting projection screen for displaying images on its both sides by reflecting and transmitting imaging light projected, comprising a reflection-type screen that reflects a specific polarized component of imaging light projected, and a transmission-type screen that transmits a polarized component of the imaging light having passed through the reflection-type screen without being reflected, the polarized component of the imaging light being different from the specific polarized component of the imaging light.

In the above-described first means of fulfilling the object of the invention, it is preferred that the reflection-type screen comprises a polarized-light selective reflection layer that selectively reflects the specific polarized component. In this case, it is preferred that the polarized-light selective reflection layer has a cholesteric liquid crystalline structure. It is also preferred that the polarized-light selective reflection layer has the function of diffusing light.

Further, in the above-described first means of fulfilling the object of the invention, it is preferred that the reflection-type screen further comprises a front-side diffraction layer that diffracts the light reflected on the polarized-light selective reflection layer to control the direction in which the light emerges from the projection screen. In this case, it is preferred that the front-side diffraction layer be formed with a transmission-type volume hologram. It is also preferred that the front-side diffraction layer has the function of diffusing light.

Furthermore, in the above-described first means of fulfilling the object of the invention, it is preferred that the reflection-type screen further comprises a retardation layer that brings a phase shift to light incident on the polarized-light selective reflection layer.

Furthermore, in the above-described first means of fulfilling the object of the invention, it is preferred that the transmission-type screen comprises a rear-side diffraction layer that diffracts the light that having passed through the reflection-type screen without being reflected. In this case, it is preferred that the rear-side diffraction layer be formed with a transmission-type volume hologram. It is also preferred that the rear-side diffraction layer has the function of diffusing light.

Furthermore, in the above-described first means of fulfilling the object of the invention, it is preferred that the specific polarized component the reflection-type screen reflects be either right- or left-handed circularly polarized light. The specific polarized component the reflection-type screen reflects may also be one of two types of linearly polarized light.

Furthermore, in the above-described first means of fulfilling the object of the invention, the projection screen may further comprise, between the reflection-type screen and the transmission-type screen, an absorption polarizer that absorbs the specific polarized component the reflection-type screen reflects. In this case, when the specific polarized component the reflection-type screen reflects is either right- or left-handed circularly polarized light, it is preferred that the absorption polarizer be a circular polarizer containing a linearly polarizing layer and a retardation layer, and that the circular polarizer be placed so that the retardation layer is positioned on the reflection-type screen side.

The present invention provides, as a second means of fulfilling the object of the present invention, a projection system comprising the transmitting-reflecting projection screen according to the aforementioned first means of fulfilling the object of the invention, and an image projection unit that projects imaging light on the transmitting-reflecting projection screen from the reflection-type screen side, the imaging light projected from the image projection unit containing at least either imaging light for reflection that contains the specific polarized component the reflection-type screen reflects, or imaging light for transmission that contains a polarized component different from the specific polarized component.

In the above-described second means of fulfilling the object of the invention, the imaging light for reflection and the imaging light for transmission may be light beams that carry either identical or different images.

Further, in the above-described second means of fulfilling the object of the invention, it is preferred that the image projection unit alternately projects the imaging light for reflection and the imaging light for transmission in time-division mode.

According to the present invention, the projection screen on which imaging light is projected comprises a reflection-type screen that reflects a specific polarized component of imaging light projected, and a transmission-type screen that transmits a polarized component of the imaging light, different from the specific polarized component, that has passed through the reflection-type screen without being reflected. Therefore, in a projection system comprising such a projection screen, if imaging light for reflection that contains the specific polarized component the reflection-type screen reflects, and imaging light for transmission that contains a polarized component different from the specific polarized component are projected on the projection screen from an image projection unit placed on the reflection-type screen side of the projection screen, an image originating from the imaging light for reflection, reflected from the reflection-type screen, is displayed on one side of the projection screen, and an image originating from the imaging light for transmission that has passed through the reflection-type screen is displayed on the other side of the projection screen. For this reason, if the imaging light for reflection and the imaging light for transmission that are projected from the image projection unit and that are different in polarization characteristics have been made to carry the desired images, even in such an embodiment that these two types of imaging light are projected, from one direction, on one side of the projection screen from the image projection unit placed on the reflection-type screen side of the projection screen, there can be displayed, on the projection screen, two identical or different images, one on each side of the screen.

Further, according to the present invention, by incorporating a polarized-light selective reflection layer that selectively reflects the specific polarized component in the reflection-type screen in the projection screen, it is possible to make the reflection-type screen reflect only approximately 50% of the incoming unpolarized extraneous light and environmental light such as illumination light. This is because the polarized-light selective reflection layer selectively reflects only the specific polarized component owing to its function of separating polarized light. Consequently, even if the brightness of a bright-indication part such as white-indication part is fixed, it is possible to increase the image contrast approximately two times by reducing, to approximately half, the brightness of a dark-indication part such as black-indication part. Thus, with a projection system comprising the above-described projection screen, it is possible to sharply display images even under bright environmental light.

Furthermore, according to the present invention, if the polarized-light selective reflection layer contained in the reflection-type screen in the projection screen is made to have a cholesteric liquid crystalline structure or the like having the function of diffusing light, this layer can reflect the specific polarized component while diffusing it and transmit the other light without diffusing it, so that light passing through the polarized-light selective reflection layer, other than imaging light, is scarcely diffused. Moreover, if a rear-side diffraction layer formed with a transmission-type volume hologram that diffracts the light that has passed through the reflection-type screen without being reflected and that has the function of diffusing light is incorporated in the transmission-type screen, the transmission-type screen can transmit, while diffusing, only the light entering at an angle around the angle that meets the diffraction condition of the rear-side diffraction layer (the angle that meets the Bragg diffraction condition of the transmission-type volume hologram), so that light passing through the rear-side diffraction layer, other than imaging light, is scarcely scattered. Namely, if the transmission-type screen is so made, the projection screen diffuses only the light in a specific state of polarization, entering at a specific angle of incidence, so that only the imaging light in a specific state of polarization, projected on the projection screen at a specific angle of incidence, is efficiently scattered. For this reason, while imaging light is projected on the projection screen, the images on both sides of the projection screen can be sharply viewed, and when imaging light is not projected on the projection screen, the scene behind the projection screen can be clearly seen through it. Moreover, even when imaging light is projected on the projection screen, the scene behind the projection screen can be clearly seen through those portions of the projection screen on which the imaging light is not projected. Such a projection screen can, therefore, be conveniently used as a see-through projection screen excellent in transparency.

Furthermore, according to the present invention, when the rear-side diffraction layer formed with a transmission-type volume hologram or the like is incorporated in the transmission-type screen in the projection screen, the transmission-type screen can diffract only the light, of the light entering from the front of the rear-side diffraction layer, entering at an angle around the angle that meets the diffraction condition of the rear-side diffraction layer (the angle that meets the Bragg diffraction condition of the transmission-type volume hologram), in a direction different from the direction of incidence of the light, irrespective of the state of polarization of the light. Therefore, the imaging light emerging from the rear-side diffraction layer (transmission-type screen) can be clearly viewed from the desired direction, and, in addition, the viewing angle of the imaging light can be readily controlled. In the case where the rear-side diffraction layer has the function of diffusing light, the imaging light that has been separated from environmental light by diffraction is scattered, so that an image can be displayed more sharply. Moreover, the viewing angle of the projection screen can be selected freely and flexibly.

Furthermore, according to the present invention, by projecting, from one direction, imaging light on one surface of the projection screen from an image projection unit placed on the reflection-type screen side of the projection screen, it is possible to display on the projection screen two identical or different images, one on each side of the screen. It is, therefore, possible to construct a projection system only by placing one image projection unit on one side of the projection screen, and the constitution of the projection system is thus extremely simplified.

In the present invention, if a front-side diffraction layer formed with a transmission-type volume hologram or the like that diffracts the light reflected from the polarized-light selective reflection layer to control the direction in which the light emerges from the projection screen is placed on the front of the polarized-light selective reflection layer in the reflection-type screen contained in the projection screen, it becomes possible to diffract light, of the light entering the front-side diffraction layer from its rear, entering at an angle around the angle that meets the diffraction condition of the front-side diffraction layer (the angle that meets the Bragg diffraction condition of the transmission-type volume hologram), in a direction different from the direction of incidence of the light, irrespective of the state of polarization of the light. Therefore, the imaging light emerging from the front-side diffraction layer (reflection-type screen) can be clearly viewed from the desired direction, and, moreover, the viewing angle of the imaging light can be easily controlled. In this case, even if the angle at which the imaging light is incident on the projection screen is made considerably great, it is possible to let the imaging light reflected from the reflection-type screen emerge from the projection screen nearly vertically to it. Consequently, the imaging light reflected from the reflection-type screen in the projection screen and the light reflected, by interfacial reflection, from the front surface of the projection screen (e.g., the surface of the front-side diffraction layer) can be separated from each other with certainty, and it is thus possible to effectively prevent mirroring that is caused by interfacial reflection on the surface of the projection screen. Further, in this case, if the front-side diffraction layer is made so that it has the function of diffusing light, the polarized-light selective reflection layer is not needed to have this function. Furthermore, when both the front-side diffraction layer and the polarized-light selective reflection layer have the function of diffusing light, the diffusion angle can be made greater by the combination of the function of diffusing light of the former layer and that of the latter layer, and the viewing angle of the projection screen can, therefore, be selected freely and flexibly.

Furthermore, in the present invention, if a retardation layer that brings a phase shift to the light incident on the polarized-light selective reflection layer is placed on the front of the polarized-light selective reflection layer in the reflection-type screen contained in the projection screen, it becomes possible to eliminate the distortion or the like of the polarization of light obliquely entering the polarized-light selective reflection layer, and the efficiency of the separation of polarized light by the polarized-light selective reflection layer can thus be increased. Moreover, even when the state of polarization of the light itself projected from the image projection unit is not the same as that of the light to be separated by the polarized-light selective reflection layer, it is possible to optimize the state of polarization of the light that enters the polarized-light selective reflection layer, by properly adjusting the phase difference the retardation layer has.

In addition, in the present invention, if an absorption polarizer is placed between the reflection-type screen and the transmission-type screen that are contained in the projection screen, a specific polarized component the projection screen reflects and a polarized component, different from the specific polarized component, that the projection screen transmits can more certainly be separated from each other. It is, therefore, possible to more sharply display on the projection screen two identical or different images, one on each side of the screen.

EMBODIMENTS FOR CARRYING OUT THE INVENTION

Embodiments of the present invention will be described hereinafter with reference to the accompanying drawings.

First of all, the constitution of a projection system comprising a transmitting-reflecting projection screen according to an embodiment of the present invention will be described with reference to FIG. 1.

Figure 1:
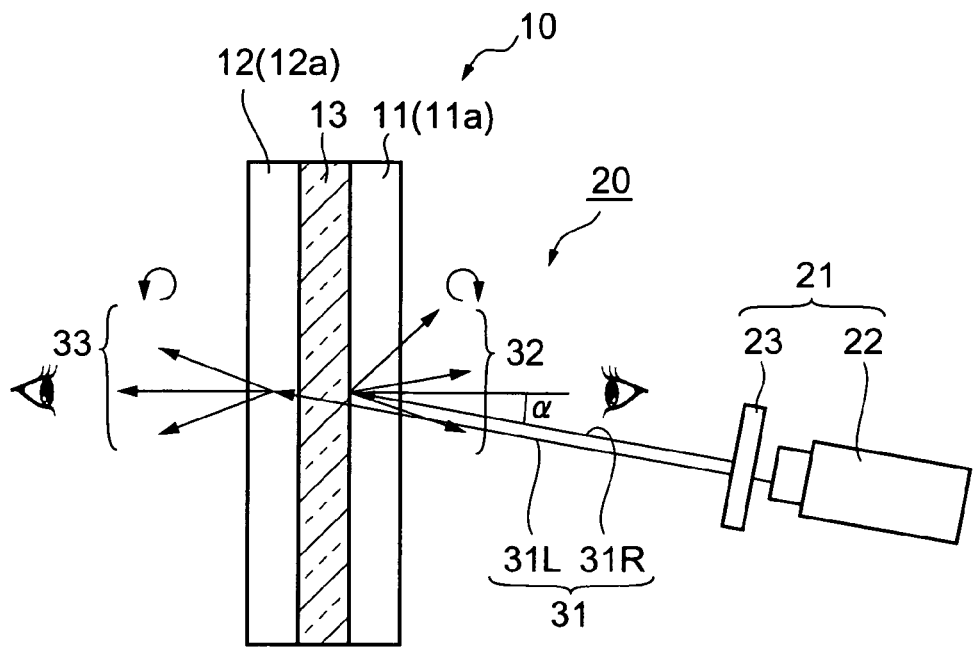
FIG. 1 is a diagrammatic view showing a projection system comprising a transmitting-reflecting projection screen according to an embodiment of the present invention.

As shown in FIG. 1, a projection system 20 according to this embodiment comprises a transmitting-reflecting projection screen 10 and an image projection unit 21 that projects imaging light 31 on the projection screen 10.

The projection screen 10 is for displaying, on its both sides, images by reflecting and transmitting the imaging light 31 projected from the image projection unit 21, and comprises a reflection-type screen 11 and a transmission-type screen 12 that are formed on the respective surfaces of a substrate 13. The refection-type screen 11 is situated on the image-projection-unit 21-side surface of the substrate 13, while the transmission-type screen 12, on the other surface of the substrate 13. Further, the reflection-type screen 11 and the transmission-type screen 12 are so arranged that at least a part of them appear superposed on each other when viewers view the projection screen from either side.

The reflection-type screen 11 has the function of separating polarized light, owing to which the imaging light 31 projected on the reflection-type screen 11 is separated into components according to the state of polarization. The reflection-type screen 11 reflects, while diffusing, a specific polarized component (for example, right-handed circularly polarized light 31R) of the imaging light 31 projected. The light reflected from the reflection-type screen 11 travels, as diffuse-reflected light 32, toward the front side (image projection unit 21 side). The transmission-type screen 12 is for transmitting, while diffusing, a polarized component (left-handed circularly polarized light 31L) of the imaging light 31, different from the specific polarized component, that has passed through the reflection-type screen 11 without being reflected. This transmitted light travels, as diffuse-transmitted light 33, toward the rear side (opposite to the image projection unit 21). Both the reflection-type screen 11 and the transmission-type screen 12 have herein the function of diffusing light (scattering properties) in an almost fixed diffusion range, and the diffusion angle of the diffuse-reflected light 32 and that of the diffuse-transmitted light 33 are fixed. The "diffusion" herein means that the reflected light reflected from the projection screen 10 (diffuse-reflected light 32), or the transmitted light that has passed through the projection screen 10 (diffuse-transmitted light 33) is spread or scattered to such a degree that viewers can recognize the light as an image.

The viewing angles at the time when the projection screen 10 is viewed from the front side and the rear side are determined by the diffusion angle of the reflection-type screen 11 and that of the transmission-type screen 12, respectively. The viewing angles on both sides of the projection screen 10 may be the same, or the viewing angle on one side of the projection screen 10 may be greater or smaller than that on the other side. Although there are no restrictions on the viewing angle on each side of the projection screen, this angle is preferably between ±10° and ±50°, more preferably between ±20° and ±40°, when the screen characteristics of the reflection-type screen 11 and those of the transmission-type screen 12 are taken into consideration. This is because, when the viewing angle (i.e., the diffusion angle) is excessively small, color breakup, reduction in brightness due to directivity, or the like occurs.

The image projection unit 21 is for projecting imaging light 31 on the projection screen 10, and comprises a projector 22 and a polarization-controlling foil 23 that controls the state of polarization of the imaging light emitted from the projector 22.

The projector 22 is for emitting imaging light to be projected on the projection screen 10, and any projector such as a liquid crystal projector, a CRT projector, or a projector using a DMD element can be herein used as the projector 22.

Figure 7:
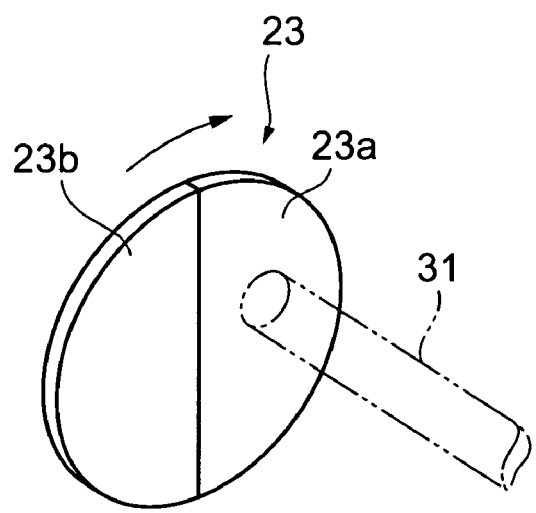
FIG. 7 is a diagrammatic perspective view for explaining the actions of an image projection unit for use in the projection systems shown in FIGS. 1 to 5.

The polarization-controlling foil 23 is for controlling the state of polarization of the imaging light emitted from the projector 22 to produce imaging light 31 containing two types of circularly polarized light different in the direction of optical rotation (right-handed circularly polarized light 31R and left-handed circularly polarized light 31L), and is composed of an optical element comprising, for example, a polarizing layer divided into a plurality of sections different in polarizing properties, and a retardation layer. More specifically, the polarization-controlling foil 23 is, as shown in FIG. 7, made of a disc member having a right-hand circular polarization section 23a that transmits right-handed circularly polarized light only and a left-hand circular polarization section 23b that transmits left-handed circularly polarized light only, and is so constructed that the right-handed circularly polarized light 31R and the left-handed circularly polarized light 31L that are contained in the imaging light 31 are emitted alternately in time-division mode, when the disc member is rotated at a constant rate as a whole. The polarization-controlling foil 23 is placed right after the aperture of the projector 22, as shown in FIG. 1. Alternatively, the polarization-controlling foil 23 may be contained in the inside of the projector 22.

The image projection unit 21 is so placed on the reflection-type-screen 11 side of the projection screen 10 that the imaging light 31 emitted via the polarization-controlling foil 23 (right-handed circularly polarized light 31R and left-handed circularly polarized light 31L) enters the reflection-type screen 11 in the projection screen 10 at an angle of incidence of α. The angle of incidence α at which the imaging light 31 projected from the image projection unit 21 is incident on the projection screen 10 is predetermined, as will be described later, on the basis of the diffraction condition of the rear-side diffraction layer 12a (transmission-type screen 12) and that of the front-side diffraction layer 17, 17' (reflection-type screen 11).

It is sufficient for the purpose that the imaging light 31 projected on the projection screen 10 from the image projection unit 21 contains two different types of polarized light, which may be not only two types of circularly polarized light (right-handed circularly polarized light 31R and left-handed circularly polarized light 31L) but also two types of linearly polarized light whose axes of polarization cross at right angles. Moreover, it is not necessary that the polarized light be strictly circularly or linearly polarized one, and elliptically polarized light (right-handed elliptically polarized light and left-handed elliptically polarized light), and the like are also useful. In the case where the imaging light 31 that is projected on the projection screen 10 from the image projection unit 21 contains two types of linearly polarized light, the polarization-controlling foil 23 for controlling the state of polarization of the imaging light emitted from the projector 22 is made so that it includes sections for two types of linear polarization with axes of polarization that cross at right angles. The type of polarized light to be contained in the imaging light 31 that is projected on the projection screen 10 from the image projection unit 21 is determined by the function of separating polarized light the reflection-type screen 11 has. It is not necessary that the state of polarization of the light itself that is projected from the image projection unit 21 is the same as that of the light to be separated by the reflection-type screen 11, and it is sufficient for the purpose that the state of polarization of the light that has passed through various members (e.g., a transparent separator, and a protective film and a retardation film that are on the projection screen 10) placed between the image projection unit 21 and the projection screen 10 is the same as that of the light to be separated by the reflection-type screen 11.

Although there are no restrictions on the wave range of the imaging light 31 that is projected on the projection screen 10 from the image projection unit 21, it is preferred that this wave range includes the wave ranges for the three primary colors of light, that is, red (R), green (G), and blue (B). Since a liquid crystal projector or the like that is conventionally used as the projector 22 in the image projection unit 21 has peak intensities in the wave ranges for red (R), green (G), and blue (B), it is desirable that the imaging light 31 to be projected on the projection screen 10 from the image projection unit 21 has wave ranges equivalent to the wave ranges for red (R), green (G), and blue (B). Specifically, for example, assuming that light enters the projection screen 10 vertically to it, it is desirable to project, as the imaging light 31, light whose selective reflection center wavelengths fall in the ranges of 430-460 nm, 540-570 nm, and 580-620 nm. However, the imaging light 31 that is projected on the projection screen 10 from the image projection unit 21 may be not only the above-described full-color light but also monochromatic light such as laser beams.

In the above-described image projection unit 21, the imaging light that is emitted from the projector 22 toward the polarization-controlling foil 23 is unpolarized light when a CRT projector or a DLP (trademark of Texas Instruments, Inc., USA) projector is used as the projector 22. In this case, a circular polarization filter includes linearly polarizing layer and a quarter retardation layer is used as the polarization-controlling foil 23 and is placed in that order from incident side (in other words, in the manner that the linearly polarizing layer is placed on the incident side), whereby the unpolarized light is converted into circularly polarized light. The polarization-controlling foil 23 has a plurality of sections as are shown in FIG. 7 (right-hand circular polarization section 23a and left-hand circular polarization section 23b), and rotates at a constant rate as a whole. The timing of emission of the imaging light from the projector 22 to the polarization-controlling foil 23 is controlled in time-division mode in coincidence with the rotation of the polarization-controlling foil 23 so that different polarized components (imaging light for reflection and imaging light for transmission) are emitted in time-division mode, as desired, via the corresponding sections of the polarization-controlling foil 23. The polarization-controlling foil 23 is divided into two sections (right-hand circular polarization section 23a and left-hand circular polarization section 23b), as shown in FIG. 7. Alternatively, the polarization-controlling foil 23 may be divided into more than two sections (e.g., 4 or 8 sections).

On the other hand, when a liquid crystal projector is used as the projector 22 in the image projection unit 21, the imaging light that is emitted from the projector 22 to the polarization-controlling foil 23 is light in a specific state of polarization (linearly polarized light). In this case, a retardation filter composed of retardation layers is used as the polarization-controlling foil 23 to convert the linearly polarized light into circularly polarized light. The polarization-controlling foil 23 herein includes a plurality of sections (e.g., two retardation sections with slow axes of +45° and −45°) for producing two types of circularly polarized light different in the axis of polarization (right-handed circularly polarized light and left-handed circularly polarized light), and rotates at a constant rate as a whole. Further, the timing of emission of the imaging light from the projector 22 to the polarization-controlling foil 23 is controlled in time-division mode in coincidence with the rotation of the polarization-controlling foil 23 so that different polarized components (imaging light for reflection and imaging light for transmission) are emitted in time-division mode, as desired, via the corresponding sections of the polarization-controlling foil 23. In this case, the respective sections of the polarization-controlling foil 23 (e.g., two retardation sections with slow axes of +45° and −45°) have slow axes extending in the predetermined directions, and these slow axes make specified angles with the axis of polarization of the linearly polarized light that is emitted from the projector 22 to the polarization-controlling foil 23. For this reason, in order to project linearly polarized light from the projector 22 only at such timing that the axis of polarization of the linearly polarized light emitted from the projector 22 to the polarization-controlling foil 23 and the slow axis of each section of the polarization-controlling foil 23 make a specified angle (e.g., 45°), it is desirable to place a shutter between the projector 22 and the polarization-controlling foil 22 and to open or close the shutter according to the rate of rotation of the polarization-controlling foil 23. Although such a polarization-controlling foil 23 may be divided into two sections, it is more preferable to divide the polarization-controlling foil 23 into more than two sections (e.g., 8 sections).

Further, in the above-described image projection unit 21, the right-handed circularly polarized light 31R and the left-handed circularly polarized light 31L that are contained in the imaging light 31 to be projected on the projection screen 10 may be ones carrying images that are either identical or different. In order to display on the projection screen 10 two different images, one on each side of the screen, it is desirable to alternately projecting, from the projector 22, the imaging light for reflection (imaging light to be displayed on the reflection-type-screen 11-side surface of the projection screen 10) and the imaging light for transmission (imaging light to be displayed on the transmission-type-screen 12-side surface of the projection screen 10) in time-division mode, and to rotate the polarization-controlling foil 23 in coincidence with the timing of projection of each imaging light. By this, the imaging light beams carrying different images pass through the corresponding sections of the polarization-controlling foil 23 (right-hand circular polarization section 23a and left-hand circular polarization section 23b), and are projected on the projection screen 10 as different polarized components, so that there can be displayed substantially simultaneously on the projection screen 10 two different images, one on each side of the screen. Such a method for controlling polarized-light images by the use of only one image projection unit 21 (projector 22) is described in detail also in the specification of Japanese Patent Application No. 2003-391998, for example. As long as the image projection unit has the above-described constitution, the imaging light for reflection and the imaging light for transmission that are projected alternately in time-division mode can be made to carry identical images, or the switching between the imaging light for reflection and the imaging light for transmission can be temporarily made; in this way, it is possible to make various modifications depending on use environments. Further, in the case where two different images are displayed on the projection screen 10, if the images are human images, it is possible to simultaneously display a face-side image on one surface of the projection screen 10 and a back-side image on the other surface of the projection screen 10.

According to the above-described constitution, the imaging light 31 that is projected on the projection screen 10 from the image projection unit 21 can fulfill the purpose as long as it is projected on one surface of the projection screen 10 from one direction. Therefore, to place only one image projection unit 21 (projector 22) on one side of the projection screen 10 suffices the purpose whether the images to be displayed on both sides of the projection screen 10 are identical or not. It is, of course, possible to place two or more image projection units 21 (projectors 22). In this case, it becomes possible to project different polarized components (imaging light beams carrying images that are either identical or different) from the respective image projection units (projectors).

The projection screen 10 for use in the aforementioned projection system 20 will be described hereinafter in detail.

(Reflection-Type Screen)

The reflection-type screen 11 contained in the projection screen 10 will be firstly described below.

The reflection-type screen 11 contains a polarized-light selective reflection layer 11a that selectively reflects a specific polarized component (right-handed circularly polarized light 31R) of imaging light projected. The polarized-light selective reflection layer 11a is not an absorption polarizing layer that is conventionally used as a polarizer, but a polarizing layer having the function of separating polarized light, owing to which two types of polarized light are separated from each other as reflected light and transmitted light.

A polarized-light-separating film or the like having a cholesteric liquid crystalline structure, for example, may be used for the polarized-light selective reflection layer 11a. Such a polarized-light selective reflection layer 11a made of a polarized-light-separating film or the like has the function of separating two types of circularly polarized light that are different in the direction of optical rotation (right-handed circularly polarized light and left-handed circularly polarized light), within the range of color (selective reflection wave range) corresponding to the helical pitch in the cholesteric liquid crystalline structure. For the polarized-light selective reflection layer 11a may be used not only a polarized-light-separating film having a cholesteric liquid crystalline structure, but also a polarized-light-separating film composed of two or more laminated films with different refractive indices (e.g., a multi-layer film (D-BEF) manufactured by Sumitomo 3M Limited, Japan), and the like. The polarized-light selective reflection layer 11a made of such a polarized-light-separating film or the like has the function of separating two types of linearly polarized light whose axes of polarization cross at right angles.

It is preferred that the polarized-light selective reflection layer 11a itself has the function of diffusing light. This is because, if a member (such as a diffusing layer or an anti-glaring layer) having the function of diffusing light is provided separately from the polarized-light-separating reflection layer 11a, light other than imaging light is also scattered to decrease the transparency of the projection screen 10 as a whole.

It is herein preferred that the polarized-light selective reflection layer 11a having a cholesteric liquid crystalline structure contains a plurality of helical-structure parts that are different in the direction of helical axis, and that the polarized-light selective reflection layer 11a has, owing to such structural non-uniformity of the cholesteric liquid crystalline structure, the self-diffusing properties of diffusing light that is selectively reflected. In this case, the polarized-light selective reflection layer 11a reflects a specific polarized component while diffusing it and transmits the other light without diffusing it, so that light passing through the polarized-light selective reflection layer 11a, other than imaging light, is never scattered. The state that the cholesteric liquid crystalline structure is structurally non-uniform herein includes the state that the helical-structure parts of the cholesteric liquid crystalline structure are different in the direction of helical axis; the state that at least some of the planes of nematic layers (the planes on which the directors of liquid crystalline molecules point in the same X-Y direction) are not parallel to the plane of the polarized-light selective reflection layer 11a (the state that, in a sectional view, using TEM photo, of a cholesteric liquid crystalline structure specimen that has been stained, continuous curves that appear as light-and-dark patterns are not parallel to the substrate plane); and the state that finely divided particles of a cholesteric liquid crystal are dispersed in the cholesteric liquid crystalline structure as a pigment.

On the contrary, a conventional cholesteric liquid crystalline structure is in the state of planar orientation, and all of the helical axes in the helical-structure parts of the cholesteric liquid crystalline structure extend in parallel in the direction of the thickness of the layer. Therefore, light to be selectively reflected is reflected from such a cholesteric liquid crystalline structure by specular reflection.

It is preferred that the helical-structure parts of the cholesteric liquid crystalline structure of the polarized-light selective reflection layer 11a have such specific helical pitches that the polarized-light selective reflection layer 11a selectively reflects light in specific wave ranges that cover only a part of the visible light range (e.g., the wave range of 400 to 700 nm). More specifically, it is preferred that the cholesteric liquid crystalline structure of the polarized-light selective reflection layer 11a has at least two discontinuously varied helical pitches so that the polarized-light selective reflection layer 11a selectively reflects only the light in a wave range equivalent to the wave range of the imaging light that is projected from the image projection unit 21. As mentioned above, the projector 22 in the image projection unit 21 achieves color display by light in the wave ranges for red (R), green (G), and blue (B), the three primary colors of light. Therefore, assuming that light enters the polarized-light selective reflection layer 11a vertically to it, it is preferable to determine the helical pitches in the cholesteric liquid crystalline structure so that the polarized-light selective reflection layer 11a selectively reflects light with selective reflection center wavelengths that fall in the ranges of 430-460 nm, 540-570 nm, and 580-620 nm. By thus making the polarized-light selective reflection layer 11a selectively reflect only the light in a wave range equivalent to the wave range of the imaging light 31 that is projected on the projection screen 10 from the image projection unit 21, it is possible to prevent reflection of the light, of the incoming extraneous light and environmental light such as illumination light, that is in the visible light range but not in the above-described wave ranges, thereby enhancing image contrast (the efficiency of reflection of the imaging light 31) to provide higher image visibility.

The above-described bands that are used as the wave ranges for red (R), green (G), and blue (B) are common wave ranges for color filters, light sources, etc. for use in displays that produce white color by the three primary colors of light. Red (R), green (G), and blue (B) colors are given as line spectra that peak at specific wavelengths (e.g., in the case of green (G), this wavelength is typically 550 nm). These line spectra have certain widths, and, moreover, the wavelength varies depending upon the design of the unit, the type of the light source, and the like. It is, therefore, preferred that the wavelength band for each color has a width of 30-40 nm.

In the case where the wave ranges for red (R), green (G), and blue (B) are given as independent selective reflection wave ranges, it is preferred that the cholesteric liquid crystalline structure of the polarized-light selective reflection layer 11a has three discontinuously varied helical pitches. There is a case where the wave ranges for red (R) and green (G) are included in the wavelength band of a selective reflection wave range corresponding to one helical pitch. In this case, it is preferred that the cholesteric liquid crystalline structure has two discontinuously varied helical pitches.

When the cholesteric liquid crystalline structure of the polarized-light selective reflection layer 11a has two or more discontinuously varied helical pitches, two or more partial selective reflection layers that are different in helical pitch may be laminated to form the polarized-light selective reflection layer 11a. It is preferred that the polarized-light selective reflection layer 11a (or each partial selective reflection layer constituting the polarized-light selective reflection layer 11a) be formed to have such a thickness that it can reflect approximately 100% of light in a specific state of polarization that is selectively reflected (such a thickness that the reflectance is saturated). This is because when the polarized-light selective reflection layer 11a has a reflectance of less than 100% for a specific polarized component that is selectively reflected (e.g., right-handed circularly polarized light), it cannot efficiently reflect imaging light. Although the reflectance of the polarized-light selective reflection layer 11a depends directly on the number of helical turns, it depends indirectly on the thickness of the polarized-light selective reflection layer 11a if the helical pitch is fixed. Specifically, since it is said that approximately 4 to 8 helical turns are needed to make the reflectance 100%, each partial selective reflection layer that reflects light in the red (R), green (G) or blue (B) color wave range is required to have a thickness of approximately 1 to 10 μm although this thickness varies depending on the type of the material (e.g., a cholesteric liquid crystalline composition) for forming the polarized-light selective reflection layer 11a, or on the selective reflection wave range of this layer. On the other hand, each partial selective reflection layer should not be made thick limitlessly because if the layer is made excessively thick, it becomes difficult to control the orientation of the layer, or the layer cannot be made uniform, or the material itself for the layer absorbs light to a greater extent. For this reason, the above-described thickness range is proper.

The cholesteric liquid crystalline structure of the polarized-light selective reflection layer 11a has the optical properties that, when light is obliquely incident on the polarized-light selective reflection layer 11a, the selective reflection wave range of this layer is shifted to the shorter wavelength side (so-called "blue shift" occurs). It is, therefore, preferable to properly adjust the helical pitches in the cholesteric liquid crystalline structure according to the angle of incidence α at which the imaging light 31 is projected on the projection screen 10 from the image projection unit 21.

(Transmission-Type Screen)

Next, the transmission-type screen 12 contained in the projection screen 10 will be described.

The transmission-type screen 12 has a rear-side diffraction layer 12a that diffracts the light that has passed through the reflection-type screen 11 without being reflected (left-handed circularly polarized light 31L).

For the rear-side diffraction layer 12a, it is preferable to use a transmission-type volume hologram, for example. Such a rear-side diffraction layer 12a formed with a transmission-type volume hologram diffracts the light, of the light entering the rear-side diffraction layer 12a from its front, entering at an angle around the angle that meets the diffraction condition of the rear-side diffraction layer 12a (the angle that meets the Bragg diffraction condition of the transmission-type volume hologram), in a direction different from the direction of incidence of the light, irrespective of the state of polarization of the light. Therefore, the imaging light (diffuse-transmitted light 33) emerging from the rear-side diffraction layer 12a (transmission-type screen 12) can be clearly viewed from the desired direction, and, moreover, the viewing angle of the imaging light (diffuse-transmitted light 33) can be readily controlled.

It is preferred that the rear-side diffraction layer 12a itself has the function of diffusing light. This is because, if a member (such as a diffusing layer or an anti-glaring layer) having the function of diffusing light is provided separately from the rear-side diffraction layer 12a, light other than the imaging light is also scattered to decrease the transparency of the projection screen 10 as a whole.

Figure 8:
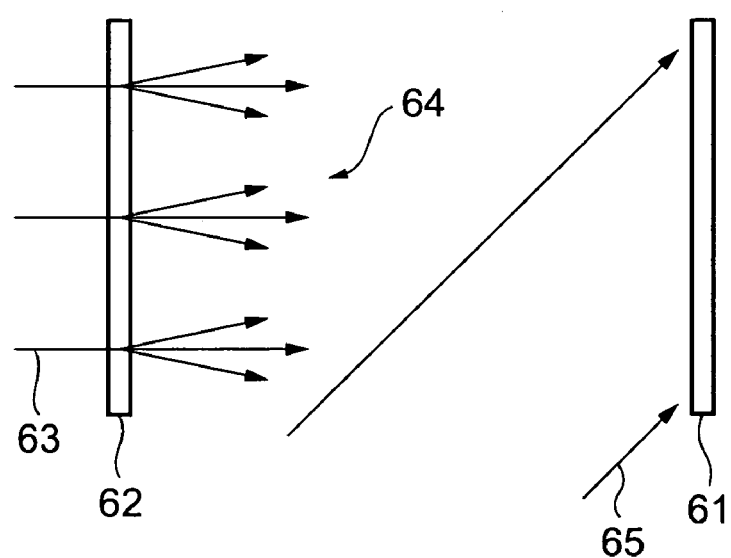
FIG. 8 is a diagrammatic view for explaining a method for making a diffraction layer (a diffraction layer having the function of diffusing light) that is used in a transmitting-reflecting projection screen according to an embodiment of the present invention.

Examples of methods for making the rear-side diffraction layer 12a having the function of diffusing light include a method in which a photo of a transmission-type volume hologram is taken in the manner shown in FIG. 8. Namely, as shown in FIG. 8, a transmission diffuser 62 is placed in nearly parallel with a photosensitive material for hologram (a hologram photosensitive material) 61 made from a photopolymer or the like, with a space left between them, to make them face each other. Illumination light 63 with a predetermined wavelength is applied to the transmission diffuser 62 from its rear to produce scattered light 64 on the other side of the transmission diffuser 62. The scattered light 64 thus produced is made to enter, as an object beam, the photosensitive material for hologram 61 to cause interference between the scattered light (an object beam) 64, and parallel light (a reference beam) 65, thereby recording a transmission-type volume hologram on the photosensitive material for hologram 61. The photosensitive material for hologram 61 on which the transmission-type volume hologram 61 has been recorded in the above-described manner finally forms the rear-side diffraction layer 12a having the function of diffusing light. The rear-side diffraction layer 12a thus produced diffracts, while diffusing, only the light entering at an angle around the angle that meets the diffraction condition of the rear-side diffraction layer 12a (the angle that meets the Bragg diffraction condition of the transmission-type volume hologram), so that the light, other than the imaging light, passing through the rear-side diffraction layer 12a is scarcely scattered.

The photosensitive material for hologram 61 is usually supported on a substrate, and a material such as a plastic film or a glass plate can be used for the substrate. In the case where the imaging light contains only a specific polarized component, the substrate for the photosensitive material for hologram 61 is preferably one that scarcely causes double refraction, such as a TAC film, a heat-resistant, transparent norbornene resin film, or a cycloolefin polymer film.

Figure 10:
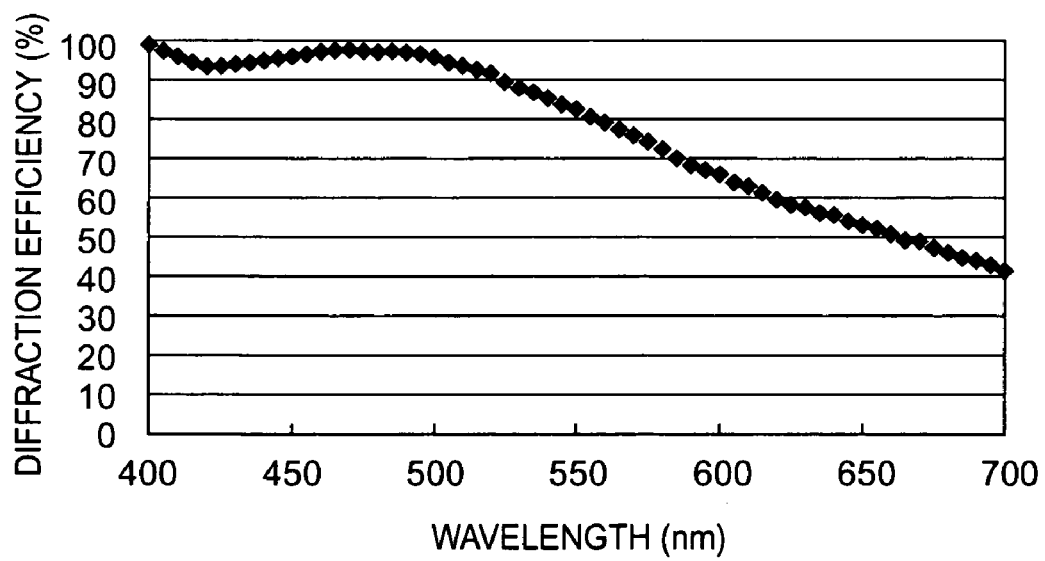
FIG. 10 is a diagram showing the diffraction characteristics (the relationship between wavelength and diffraction efficiency) of a diffraction layer that is used in a transmitting-reflecting projection screen according to an embodiment of the present invention.

Further, it is preferred that the rear-side diffraction layer 12a selectively diffracts light in a specific wave range that is included in the visible light range (e.g., a wave range of 400 to 700 nm). Specifically, for example, it is desirable that the rear-side diffraction layer 12a has the properties of efficiently diffracting light in the whole visible light range (e.g., a wave range of 400 to 700 nm), as shown in FIG. 10. Alternatively, the rear-side diffraction layer 12a may have the properties of selectively diffracting light in specific wave ranges (e.g., light in the wave ranges for red (R), green (G), and blue (B), the three primary colors of light) that cover only some parts of the visible light range (e.g., a wave range of 400 to 700 nm). By thus selectively diffracting only the light in a wave range equivalent to the wave range of the imaging light 31 that is projected on the projection screen 10 from the image projection unit 21 to separate light in the visible light range but not in the above-described wave ranges from the incoming extraneous light and environmental light such as illumination light, it is possible to make the image contrast on the rear surface of the projection screen higher and thus to obtain higher image visibility.

(Substrate)

Next, the substrate 13 contained in the projection screen 10 will be described.

The substrate 13 is for supporting the reflection-type screen 11 and the transmission-type screen 12 that are formed on its respective surfaces, and it is preferred that the substrate 13 be highly transparent and less hazy.

For the substrate 13, a board or film made from such a material as glass or a resin may be used. There are no restrictions on the resin material, and any of the following thermoplastic polymers may be used for the substrate 13: polycarbonate polymers, polyester polymers such as polyethylene terephthalate, polyimide polymers, polysulfone polymers, polyether sulfone polymers, polystyrene polymers, polyolefin polymers such as polyethylene and polypropylene, polyvinyl alcohol polymers, cellulose acetate polymers, polyvinyl chloride polymers, polyacrylate polymers, and polymethyl methacrylate polymers.

The transmittance of the substrate 13 may be freely selected, and the substrate 13 can have any transmittance as long as it remains transparent. Moreover, the color of the substrate 13 may also be freely selected, and the substrate 13 can have any color such as red or blue, as long as it remains transparent.

(Actions of Projection Screen)

The actions of the above-described projection screen 10 will be described hereinafter.

In the projection system 20 shown in FIG. 1, the imaging light 31 projected on the projection screen 10 from the image projection unit 21 enters the polarized-light selective reflection layer 11a (reflection-type screen 11).

Of the imaging light 31 that has entered the polarized-light selective reflection layer 11a (reflection-type screen 11), a specific polarized component (right-handed circularly polarized light 31R) is reflected while being diffused in the polarized-light selective reflection layer 11a (reflection-type screen 11) owing to the function of separating polarized light and the function of diffusing light that the polarized-light selective reflection layer 11a has, and emerges from the front surface of the projection screen 10 as diffuse-reflected light 32.

On the other hand, of the imaging light 31 that has entered the polarized-light selective reflection layer 11a (reflection-type screen 11), a polarized component (left-handed circularly polarized light 31L), different from the specific polarized component, passes through the polarized-light selective reflection layer 11a owing to the function of separating polarized light that the polarized-light selective reflection layer 11a has, and enters the rear-side diffraction layer 12a (transmission-type screen 12). Of the left-handed circularly polarized light 31L that has entered the rear-side diffraction layer 12a in the above-described manner, the light that has entered at the angle that meets the diffraction condition of the rear-side diffraction layer 12a (the angle that meets the Bragg diffraction condition of the transmission-type volume hologram) is diffracted and diffused by the rear-side diffraction layer 12a, and is emitted, as diffuse-transmitted light 33, nearly vertically to the projection screen 10.

Thus, an image originating from the imaging light reflected from the reflection-type screen 11 (diffuse-reflected light 32) is displayed on one surface of the projection screen 10, while an image originating from the imaging light that has passed through the reflection-type screen 11 (diffuse-transmitted light 33) is displayed on the other surface of the projection screen 10.

(Process for Producing Projection Screen)

A process for producing the aforementioned projection screen 10 will be described hereinafter.

First of all, a reflection-type screen 11 is formed on a substrate 13. For example, a liquid crystalline composition having a cholesteric structure is applied to a substrate 13, and is then subjected to aligning treatment and curing treatment, thereby laminating a polarized-light selective reflection layer 11a to the substrate 13.

In the above process, since it is necessary to control the cholesteric liquid crystalline structure of the polarized-light selective reflection layer 11a so that it is not brought to the state of planar orientation, it is preferable to use, as the substrate 13, a material whose surface to which the liquid crystalline composition will be applied has no aligning power. However, even when a material whose surface to which the liquid crystalline composition will be applied has aligning power, like a stretched film or the like, is used as the substrate 13, the cholesteric liquid crystalline structure of the polarized-light selective reflection layer 11a can be controlled not to be brought to the state of planar orientation if this surface of the material is subjected to surface treatment in advance, or the components of the liquid crystalline composition are properly selected, or the process conditions under which the liquid crystalline composition is oriented are controlled.

Further, even if a material whose surface to which the liquid crystalline composition will be applied has aligning power is used as the substrate 13, it is possible to control the orientation of the cholesteric liquid crystalline structure of the polarized-light selective reflection layer 11a by providing an intermediate layer 13, such as an adhesion-promoting layer, between the polarized-light selective reflection layer 11a and the substrate 13, thereby directing, to two or more directions, the directors of liquid crystalline molecules constituting the cholesteric liquid crystalline structure of the polarized-light selective reflection layer 11a, existing in the vicinity of the intermediate layer. By providing the intermediate layer such as an adhesion-promoting layer, it is also possible to improve the adhesion between the polarized-light selective reflection layer 11a and the substrate 13. For such an intermediate layer, any material can be used as long as it is highly adherent to both the material for the polarized-light selective reflection layer 11a and the material for the substrate 13, and commercially available ones may be used. Specific examples of commercially available materials useful herein include an adhesion-promoting-layer-containing PET film A4100 manufactured by Toyobo Co., Ltd., Japan, and adhesion-promoting materials AC-X, AC-L and AC-W manufactured by Panack Co., Ltd., Japan.

Such an intermediate layer may have barrier properties. An intermediate layer having barrier properties is for preventing a lower layer from being mixed with an upper layer in the step of lamination of the polarized-light selective reflection layer 11*a* made from the liquid crystalline composition, and specifically has the properties of preventing migration of the liquid crystalline component between layers.

In the case where the surface of the substrate 13 has no aligning power and the adhesion between the polarized-light selective reflection layer 11*a* and the substrate 13 is satisfactorily high, it is not necessarily required to provide the intermediate layer. To improve the adhesion between the polarized-light selective reflection layer 11*a* and the substrate 13, there may also be employed a process-related method such as corona discharge treatment or UV cleaning.

Since such a process for forming the polarized-light selective reflection layer 11*a* (reflection-type screen 11) is described in detail in the specification of Japanese Patent Application No. 2003-165687, and, moreover, it is not related directly to the features of the present invention, the detailed explanation of the process will be herein omitted.

After laminating the polarized-light selective reflection layer 11*a* to the substrate 13 in the above-described manner, a rear-side diffraction layer 12*a* (transmission-type screen 12) formed with a transmission-type volume hologram that has been photographed in the manner shown in FIG. 8 is laminated to the other surface of the substrate 13, opposite to the surface on which the polarized-light selective reflection layer 11*a* (reflection-type screen 11) has been formed.

Thus, there is produced a projection screen 10 which the polarized-light selective reflection layer 11*a* (reflection-type screen 11) and the rear-side diffraction layer 12*a* (transmission-type screen 12) are formed on the respective surfaces of the substrate 13.

According to this embodiment, the projection screen 10 on which imaging light 31 is projected from an image projection unit 21 comprises the reflection-type screen 11 that reflects, while diffusing, a specific polarized component (right-handed circularly polarized light 31R) of the imaging light 31 projected, and the transmission-type screen 12 that transmits, while diffusing, a polarized component (left-handed circularly polarized light 31L) of the imaging light 31, different from the specific polarized component, that has passed through the reflection-type screen 11 without being reflected. Therefore, in a projection system 20 comprising such a projection screen 10, when imaging light for reflection, containing the right-handed circularly polarized light 31R the reflection-type screen 11 reflects, and imaging light for transmission, containing the left-handed circularly polarized light 31L, are projected on the projection screen 10 from the image projection unit 21 placed on the reflection-type screen 11 side of the projection screen 10, an image originating from the imaging light for reflection, reflected from the reflection-type screen 11, is displayed on one surface of the projection screen 10, while an image originating from the imaging light for transmission that has passed through the reflection-type screen 11 is displayed on the other surface of the projection screen 10. For this reason, if the imaging light for reflection and the imaging light for transmission that are projected from the image projection unit 21 and that have different polarization characteristics have been made to carry the desired images, even in such an embodiment that the imaging light 31 is projected, from one direction, on one surface of the projection screen 10 from the image projection unit 21 placed on the reflection-type screen 11 side of the projection screen 10, it is possible to display on the projection screen 10 two identical or different images, one on each side of the screen.

Further, according to this embodiment, the reflection-type screen 11 in the projection screen 10 contains the polarized-light selective reflection layer 11*a* that selectively reflects a specific polarized component, and selectively reflects only the specific polarized component (e.g., right-handed circularly polarized light 31R) owing to the function of separating polarized light that the polarized-light selective reflection layer 11*a* has, so that it is possible to make the reflection-type screen 11 reflect only approximately 50% of the incoming unpolarized extraneous light or environmental light such as illumination light. Therefore, even if the brightness of a bright-indication part such as white-indication part is fixed, it is possible to increase the image contrast two times by reducing, to approximately half, the brightness of a dark-indication part such as black-indication part. Thus, with the projection system 20 comprising the projection screen 10, it is possible to sharply display images even under bright environmental light.

Furthermore, according to this embodiment, the polarized-light selective reflection layer 11*a* contained in the reflection-type screen 11 in the projection screen 10 has a cholesteric liquid crystalline structure having the function of diffusing light, and reflects a specific polarized component while diffusing it and transmits the other light without diffusing it, so that the light passing through the polarized-light selective reflection layer 11*a*, other than the imaging light, is scarcely scattered. Moreover, the transmission-type screen 12 has the rear-side diffraction layer 12*a* having the function of diffusing light, formed with a transmission-type volume hologram that diffracts the light that has passed through the reflection-type screen 11 without being reflected, and diffracts, while diffusing, only the light entering at an angle around the angle that meets the diffraction condition of the rear-side diffraction layer 12*a* (the angle that meets the Bragg diffraction condition of the transmission-type volume hologram), so that the light passing through the rear-side diffraction layer 12*a*, other than the imaging light, is scarcely diffracted. Namely, when the projection screen 10 is so produced, the light that is diffused by the projection screen 10 is only the light in a specific state of polarization, entering at a specific angle of incidence, so that only the imaging light 31 that is in a specific state of polarization and is projected on the projection screen 10 at a specific angle of incidence is efficiently scattered. For this reason, while the imaging light 31 is projected on the projection screen 10, the images on both sides of the projection screen 10 can be sharply viewed, and when the imaging light 31 is not projected on the projection screen 10, the scene behind the projection screen 10 can be clearly seen through it. Moreover, even when the imaging light 31 is projected on the projection screen 10, it is possible to clearly see the scene behind the projection screen 10 through those portions of the projection screen 10 on which the imaging light 31 is not projected. Thus, the projection screen 10 is conveniently used as a see-through projection screen excellent in transparency. Even when a conventional sheet diffuser or the like is used as a projection screen, it is possible to produce an image on the projection screen while transmitting the projected light to some extent. However, such a sheet diffuser has a frosty appearance like frosted glass has, so that it is impossible to clearly see the scene behind the projection screen through it.

Furthermore, according to this embodiment, since the transmission-type screen 12 in the projection screen 10 contains the rear-side diffraction layer 12*a* formed with a transmission-type volume hologram, this screen diffracts the light, of the light that has entered the rear-side diffraction layer 12*a* from its front, that has entered at an angle around the angle that meets the diffraction condition of the rear-side diffraction layer 12*a* (the angle that meets the Bragg diffraction condition of the transmission-type volume hologram), in a direction different from the direction of incidence of the light, irrespective of the state of polarization of the light. It is, therefore, possible to clearly view, from the desired direction, the imaging light (diffuse-transmitted light 33) emerging from the transmission-type screen 12, and, moreover, it is possible to easily control the viewing angle of the imaging light (diffuse-transmitted light 33).

Furthermore, according to this embodiment, since it is possible to simultaneously display on the projection screen 10 two identical or different images, one on each side of the screen, by projecting the imaging light 31 on one surface of the projection screen 10 from one direction, the projection system 20 can be constructed by placing only one image projection unit on one side of the projection 10. The constitution of the projection screen 10 is thus considerably simplified.

OTHER EMBODIMENTS

Figure 2:
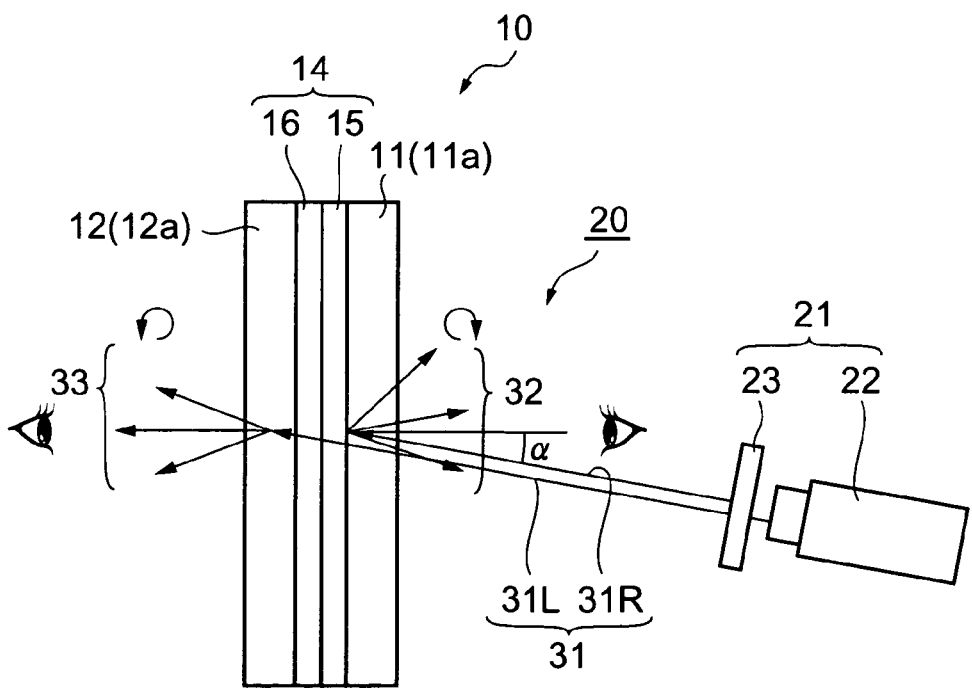
FIG. 2 is a diagrammatic view showing a projection system comprising a modification of the transmitting-reflecting projection screen shown in FIG. 1.

Although the substrate 13 is placed between the reflection-type screen 11 and the transmission-type screen 12 in the above-described embodiment, an absorption polarizer 14 may be placed, instead of the substrate 13, between the two screens, as shown in FIG. 2. The absorption polarizer 14 is for absorbing a specific polarized component the reflection-type screen 11 reflects, and a polarizer suited to the function of separating polarized light that the reflection-type screen 11 has is herein used as the absorption polarizer 14. Specifically, for example, when the reflection-type screen 11 has the function of separating circularly polarized light, a circular polarizer composed of a retardation layer 15 and a linearly polarizing layer 16, as is shown in FIG. 2, is used as the absorption polarizer 14. There is a distinction between face and back in the circular polarizer composed of a retardation layer 15 and a linearly polarizing layer 16, and, in the constitution as shown in FIG. 2, it is preferred that the retardation layer 15 be positioned on the reflection-type screen 11 side and that the linearly polarizing layer 16 be positioned on the transmission-type screen 12 side. On the other hand, when the reflection-type screen 11 has the function of separating linearly polarized light, a linear polarizer is used as the absorption polarizer 14. By thus placing the absorption polarizer 14 between the reflection-type screen 11 and the transmission-type screen 12, it becomes possible to more certainly separate two types of polarized light that the projection screen 10 reflects and transmits, and thus to more sharply display on the projection screen 10 two identical or different images, one on each side of the screen. Since the absorption polarizer 14 becomes grayish in color as its transmittance gets lower, a color of black in an image can be effectively expressed, with the transparency of the projection screen 10 maintained high. A hazy layer like an anti-glaring layer is unfavorable for the absorption polarizer 14 for use herein; it is preferred that the absorption polarizer 14 be highly transparent and less hazy.

Figure 3:
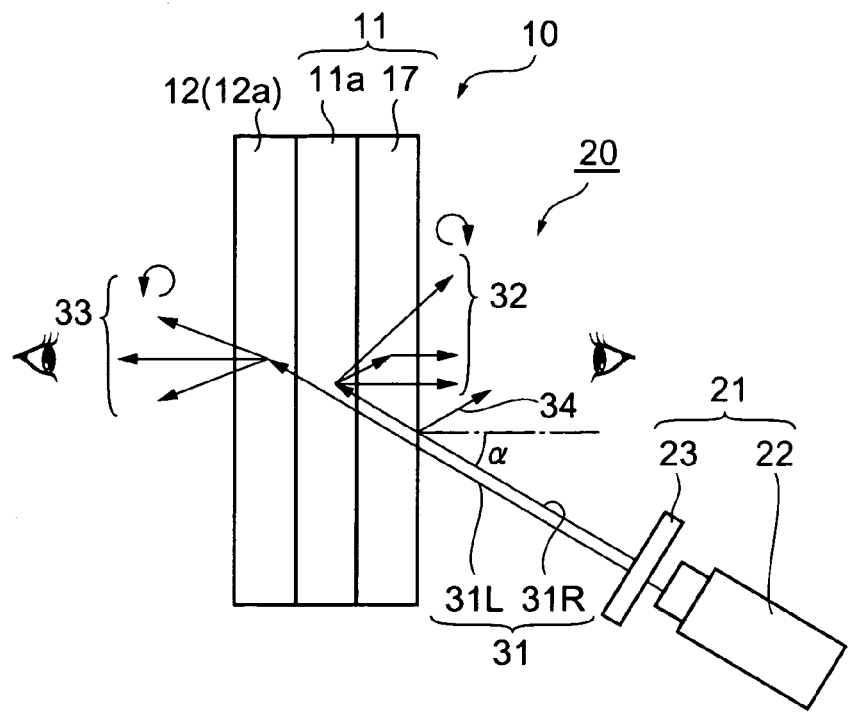
FIG. 3 is a diagrammatic view showing a projection system comprising another modification of the transmitting-reflecting projection screen shown in FIG. 1.

Further, although the reflection-type screen 11 contained in the projection screen 10 is composed only of the polarized-light selective reflection layer 11a in the aforementioned embodiment, a front-side diffraction layer 17 that diffracts the light reflected from the polarized-light selective reflection layer 11a to control the direction in which the light emerges from the projection screen 10 may further be placed on the front of the polarized-light selective reflection layer 11a in the reflection-type screen 11, as in a projection system 20 shown in FIG. 3. It is herein preferred that the front-side diffraction layer 17 be formed with a transmission-type volume hologram. In this case, the front-side diffraction layer 17 diffracts the light, of the light that has entered the front-side diffraction layer 17 from its rear, that has entered at an angle around the angle that meets the diffraction condition of the front-side diffraction layer 17 (the angle that meets the Bragg condition of the transmission-type volume hologram), in a direction different from the direction of incidence of the light (e.g., nearly vertically to the projection screen 10), irrespective of the state of polarization of the light. It is, therefore, possible to clearly view, from the desired direction, the imaging light (diffuse-reflected light 32) emerging from the front-side diffraction layer 17 (reflection-type screen 11), and, moreover, it is possible to readily control the viewing angle of the imaging light.

Specifically, in the projection system 20 shown in FIG. 3, the imaging light 31 projected on the projection screen 10 from the image projection unit 21 passes through the front-side diffraction layer 17 in the reflection-type screen 11 without being diffracted, and enters the polarized-light selective reflection layer 11a.

Of the imaging light 31 that has entered the polarized-light selective reflection layer 11a (reflection-type screen 11), a specific polarized component (right-handed circularly polarized light 31R) is reflected while being diffused in the polarized-light selective reflection layer 11a owing to the function of separating polarized light and the function of diffusing light that the polarized-light selective reflection layer 11a has, and enters the front-side diffracting layer 17 from its rear. The light entering the front-side diffraction layer 17 in this manner is diffused light, and it passes through the front-side diffraction layer 17 and finally emerges, as diffuse-reflected light 32, from the front surface of the projection screen 10. At this time, of the light that has entered the front-side diffraction layer 17 in the reflection-type screen 11, the light that has entered at the angle that meets the diffraction condition of the front-side diffraction layer 17 (the angle that meets the Bragg diffraction condition of the transmission-type volume hologram) is diffracted by the front-side diffraction layer 17 and emerges from the projection screen 10 nearly vertically to it.

On the other hand, of the imaging light 31 that has entered the polarized-light selective reflection layer 11a (reflection-type screen 11), a polarized component (left-handed circularly polarized light 31L), different from the above-described specific polarized component, passes through the polarized-light selective reflection layer 11a, owing to the function of separating polarized light the polarized-light selective reflection layer 11a has, and enters the rear-side diffraction layer 12a (transmission-type screen 12). The left-handed circularly polarized light 31L that has entered the rear-side diffraction layer 12a in the above-described manner passes through this layer while being diffused in it, owing to the function of diffusing light that the rear-side diffraction layer 12a has, and emerges from the rear of the projection screen 10 as the diffuse-transmitted light 33. At this time, of the imaging light that has entered the rear-side diffraction layer 12a, the light that has entered at the angle that meets the diffraction condition of the rear-side diffraction layer 12a (the angle that meets the Bragg diffraction condition of the transmission-type volume hologram) is diffracted by the rear-side diffraction layer 12a and emerges from the projection screen 10 nearly vertically to it.

In the projection screen 10 shown in FIG. 3, since the front-side diffraction layer 17 is placed on the front of the polarized-light selective reflection layer 11a contained in the reflection-type screen 11, even if the angle of incidence α at which the imaging light 31 is incident on the projection screen 10 is made considerably great, it is possible to let the diffuse-reflected light 32 reflected from the reflection-type screen 11 emerge from the projection screen 10 nearly vertically to it. Consequently, the imaging light reflected from the reflection-type screen 11 in the projection screen 10 (diffuse-reflected light 33), and the light 34 reflected, by interfacial reflection, from the front surface of the projection screen 10 (the surface of the front-side diffraction layer 17) can be separated from each other with certainty, and it is thus possible to effectively prevent mirroring that is caused by interfacial reflection on the surface of the projection screen 10.

Further, in the projection screen 10 shown in FIG. 3, both the reflection-type screen 11 and the transmission-type screen 12 have diffraction layers formed with transmission-type volume holograms (the front-side diffraction layer 17 and the rear-side diffraction layer 12a). It is, therefore, possible to control the diffuse-reflected light 32 and the diffuse-transmitted light 33 so that they emerge from the front and the rear of the projection screen 10, respectively, in any direction including the vertical direction, irrespective of the angle of incidence α at which the imaging light 31 has entered the projection screen 10.

Figure 4:
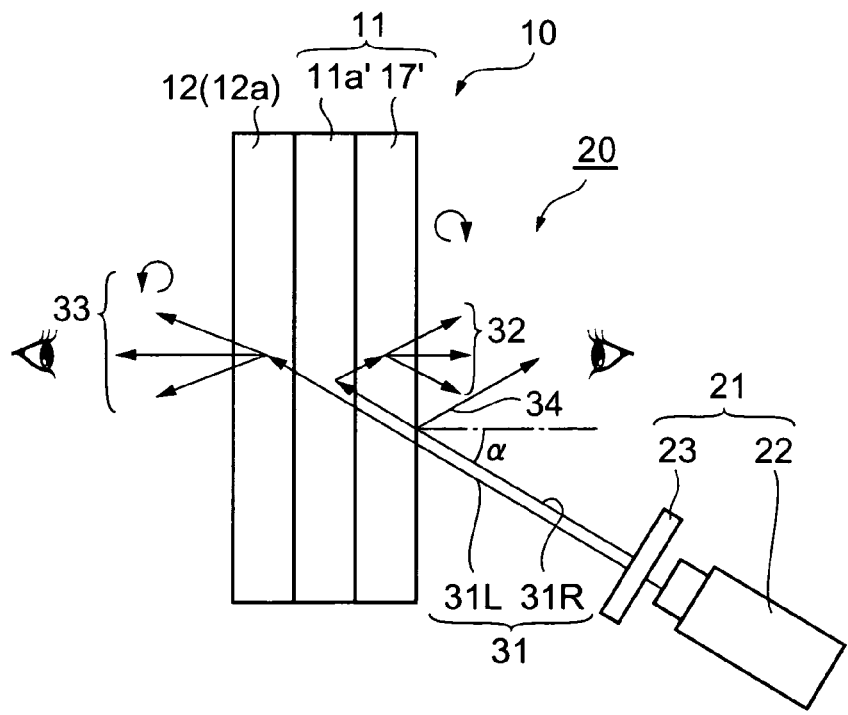
FIG. 4 is a diagrammatic view showing a projection system comprising a further modification of the transmitting-reflecting projection screen shown in FIG. 1.
Figure 5:
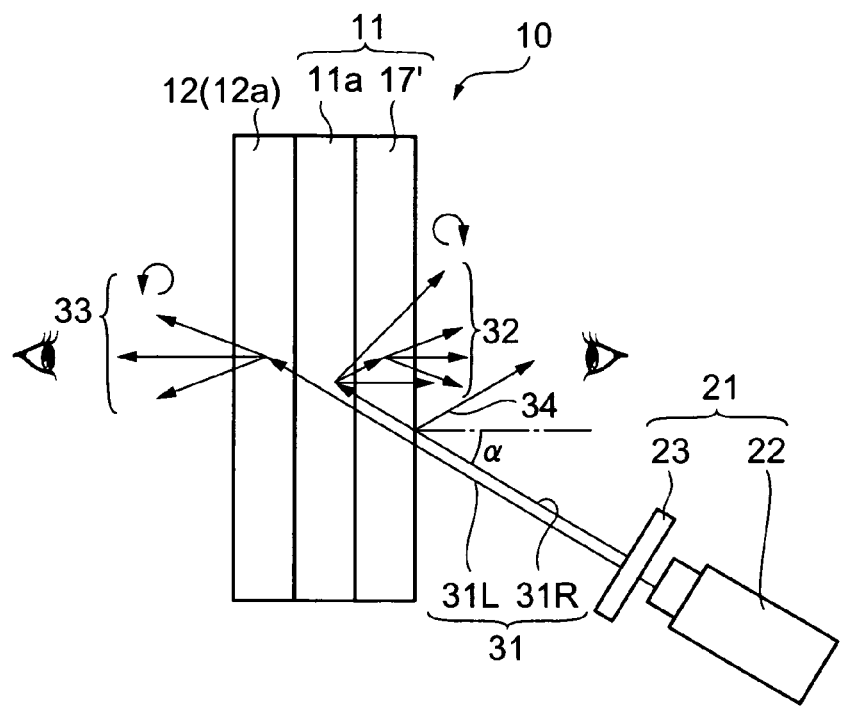
FIG. 5 is a diagrammatic view showing a projection system comprising a still further modification of the transmitting-reflecting projection screen shown in FIG. 1.

In the projection screen 10 shown in FIG. 3, the polarized-selective reflection layer 11a contained in the reflection-type screen 11 has the function of diffusing light, while the front-side diffraction layer 17 does not have the function of diffusing light. It is sufficient to meet the purpose that at least either the polarized-selective reflection layer 11a or the front-side diffraction layer 17 has the function of diffusing light. For example, a polarized-light selective reflection layer 11a' that does not have the function of diffusing light and a front-side diffraction layer 17' having the function of diffusing light may be used in combination, as shown in FIG. 4. Further, as shown in FIG. 5, the polarized-light selective reflection layer 11a having the function of diffusing light and the front-side diffraction layer 17' having the function of diffusing light may be used in combination. When both the polarized-light selective reflection layer 11a and the front-side diffraction layer 17' have the function of diffusing light, as shown in FIG. 5, the diffusion angle can be made greater by the combination of the function of diffusing light of the former layer and that of the latter layer. It is thus possible to select freely and flexibly the viewing angle of the projection screen 10 (e.g., the viewing angle in the vertical direction).

Figure 9:
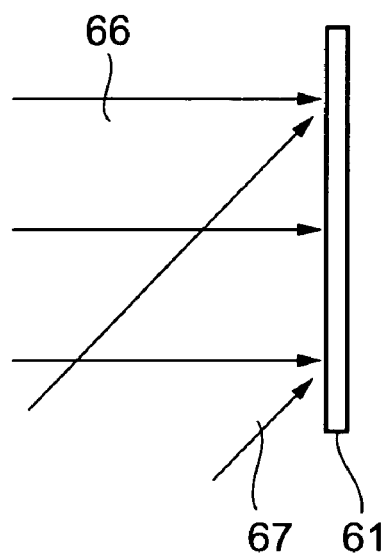
FIG. 9 is a diagrammatic view for explaining a method for making a diffraction layer (a diffraction layer that does not have the function of diffusing light) that is used in a transmitting-reflecting projection screen according to an embodiment of the present invention.

To make the front-side diffraction layer 17' having the function of diffusing light, it is possible to employ the same method as that for making the rear-side diffraction layer 12a described above (the method shown in FIG. 8). On the other hand, to make the front-side diffraction layer 17 that does not have the function of diffusing light, there may be employed a method in which a photo of a transmission-type volume hologram is taken in the manner shown in FIG. 9. Namely, as shown in FIG. 9, parallel light 66 is applied as an object beam to a photosensitive material for hologram (a hologram photosensitive material) 61 made from a photopolymer or the like nearly vertically to the material, and, at the same time, parallel light 67 is applied as a reference beam to the photosensitive material for hologram 61, thereby causing interference between the parallel light (an object beam) 66 and the parallel light (a reference beam) 67 to record a transmission-type volume hologram on the photosensitive material for hologram 61. The photosensitive material for hologram 61 on which the transmission-type volume hologram has been recorded in the above-described manner finally forms the front-side diffraction layer 17 that does not have the function of diffusing light.

It is desirable that, like the above-described rear-side diffraction layer 12a, the front-side diffraction layer 17, 17' selectively diffracts light in specific wave ranges included in the visible light range (e.g., a wave range of 400 to 700 nm), or selectively diffracts only the light in a wave range equivalent to the wave range of the imaging light that is projected from the image projection unit 21.

Figure 6:
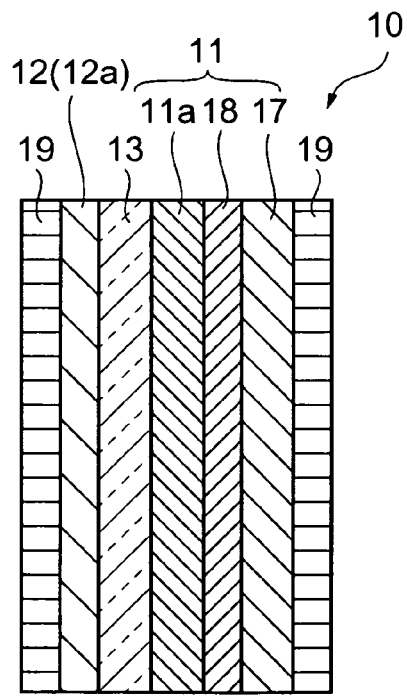
FIG. 6 is a diagrammatic sectional view showing a modification of the transmitting-reflecting projection screens that are used in the projection systems shown in FIGS. 1 to 5.

Further, in the above-described embodiment, the reflection-type screen 11 may further contain, on the front of the polarized-light selective reflection layer 11a, a retardation layer 18 that brings a phase shift to the light incident on the polarized-light selective reflection layer 11a, as shown in FIG. 6. In the case where the reflection-type screen 11 contains the front-side diffraction layer 17 on the front of the polarized-light selective reflection layer 11a, the retardation layer 18 may be placed either between the polarized-light selective reflection layer 11a and the front-side diffraction layer 17, as shown in FIG. 6, or on the front of the front-side diffraction layer 17. By so placing the retardation layer 18, it is possible to eliminate the distortion or the like of the polarization of light obliquely entering the polarized-light selective reflection layer 11a, thereby increasing the efficiency of the separation of the polarized light by the polarized-light selective reflection layer 11a. Moreover, even when the state of polarization of the light itself, projected from the image projection unit 21, is not the same as that of the light to be separated by the polarized-light selective reflection layer 11a, it is possible to optimize the state of polarization of the light that enters the polarized-light selective reflection layer 11a, by properly adjusting the phase difference the retardation layer 18 has.

Furthermore, in the aforementioned embodiment, the projection screen 10 may further contain functional layers 19 on the front of the reflection-type screen 11 and the rear of the transmission-type screen 12, as shown in FIG. 6. A variety of layers can be used for the functional layers 19, and examples of functional layers useful herein include hard coat layers (HC layers), anti-reflection layers (AR layers), ultraviolet-light-absorbing layers (UV-absorbing layers), and antistatic layers (AS layers). The hard coat layer (HC layer) is for protecting the surface of the projection screen 10 and preventing it from being scratched or staining. The anti-reflection layer (AR layer) is for preventing the surface of the projection screen 10 from reflecting light by interfacial reflection. The ultraviolet-light-absorbing layer (UV-absorbing layer) is for absorbing the ultraviolet component of light incident on the projection screen 10, the UV component being the cause of yellowing of a liquid crystalline composition. The antistatic layer (AS layer) is for removing static electricity generated by the projection screen 10. It is preferred that the functional layer 19 be highly transparent and less hazy. It is also preferred that the functional layer 19 scarcely causes double refraction. Moreover, It is preferred that the functional layer 19 does not alter the state of polarization of light passing through it. However, when the functional layer 19 is designed so that it also functions as the above-described retardation layer 18, it may have the properties of the double refraction as desired degree.

In the constitution of any of the projection screens 10 shown in FIGS. 1 to 6, it is preferred that any two of the optical members (the polarized-light selective reflection layer 11a, 11a', the rear-side diffraction layer 12a, the substrate 13, the absorption polarizer 14 (the retardation layer 15 and the linearly polarizing layer 16), the front-side diffraction layer 17, 17', the retardation layer 18, the functional layers 19, etc.) be laminated with a adhesive material such as a pressure-sensitive adhesive sheet or an adhesive layer, with the two optical members in close contact with each other. In this case, in order to prevent the disturbance of polarization that is caused by interfacial reflection that occurs at the interface between the optical member and the pressure-sensitive adhesive material, it is preferable to use a adhesive material whose refractive index is nearly equal to the mean refractive index of the optical members.

EXAMPLES

Specific examples of the aforementioned embodiments will now be given below.

A first cholesteric liquid crystal solution having a selective reflection wave range with a center wavelength of 510 nm was prepared by dissolving, in cyclohexanone, a monomer-containing liquid crystal that had been obtained by adding a chiral agent (5.3% by weight) to an ultraviolet-curing nematic liquid crystal (94.7% by weight), a main component. To the first cholesteric liquid crystal solution was added 5% by weight of a photopolymerization initiator available from Ciba Speciality Chemicals K.K., Japan.

By way of a bar coating method, the above-prepared first cholesteric liquid crystal solution was applied to a substrate, a 200 mm×200 mm PET film with an adhesion-promoting layer (Lumirror/AC-X manufactured by Panack Co., Ltd., Japan).

This substrate was then heated in an oven at 80° C. for 90 seconds for alignment (drying). Thus, there was obtained a cholesteric liquid crystal layer containing no solvent.

Thereafter, ultraviolet light with a wavelength of 365 nm was applied to this cholesteric liquid crystal layer for 1 minute at 50 mW/cm$^2$ for curing, thereby obtaining a first partial selective reflection layer having a selective reflection wave range with a center wavelength of 510 nm.

Similarly, a second cholesteric liquid crystal solution was applied directly to the first partial selective reflection layer and was then subjected to aligning treatment (drying treatment) and curing treatment. Thus, a second partial selective reflection layer having a selective reflection wave range with a center wavelength of 640 nm was obtained. The same method as that for preparing the first cholesteric liquid crystal solution was employed to prepare the second cholesteric liquid crystal solution, provided that the nematic liquid crystal and the chiral agent were mixed in such a proportion that the resulting layer had a selective reflection wave range with a center wavelength of 640 nm.

Similarly, a third cholesteric liquid crystal solution was applied directly to the second partial selective reflection layer, and was then subjected to aligning treatment (drying treatment) and curing treatment. Thus, a third partial selective reflection layer having a selective reflection wave range with a center wavelength of 700 nm was obtained. The same method as that for preparing the first cholesteric liquid crystal solution was employed to prepare the third cholesteric liquid crystal solution, provided that the nematic liquid crystal and the chiral agent were mixed in such a proportion that the resulting layer had a selective reflection wave range with a center wavelength of 700 nm.

Thus, there was obtained a polarized-light selective reflection layer (also referred to as a CLC screen) composed of the first partial selective reflection layer for selectively reflecting light in the wave range for blue (B), obliquely incident at an angle of approximately 30°, the second partial selective reflection layer for selectively reflecting light in the wave range for green (G), obliquely incident at an angle of approximately 30°, and the third partial selective reflection layer for selectively reflecting light in the wave range for red (R), obliquely incident at an angle of approximately 30°, that were successively laminated in the order stated, with the first partial selective reflection layer on the substrate. The thickness of the first partial selective reflection layer was made 3 µm, that of the second partial selective reflection layer was made 4 µm, and that of the third partial selective reflection layer was made 5 µm.

The cholesteric liquid crystalline structures of the partial selective reflection layers constituting the polarized-light selective reflection layer were non-uniform, and the diffusion angle of the polarized-light selective reflection layer for right-handed circularly polarized light, incident light, was ±40°.

On the other hand, a rear-side diffraction layer was made in the following manner: a film of a photosensitive material, having a volume holographic layer, was prepared, and a transmission-type volume hologram was recorded on the volume holographic layer on this film.

Specifically, an ink composition having the following formulation, serving as the photosensitive material, was applied to Lumirror T60 (trademark of an untreated PET film, manufactured by Toray Industries, Inc., Japan) with a thickness of 50 µm, serving as a substrate, in such an amount that the dried ink layer had a thickness of 13 µm, and was then dried to give a volume holographic layer. Release paper, SP-PET03-BU (trademark of a PET film with a surface having release properties, manufactured by TOHCELLO Co., Ltd., Japan), was laminated to the volume holographic layer, whereby a film composed of Lumirror T60/the volume holographic layer/SP-PET was obtained.

(Formulation of Ink Composition)

| | |
|---|---|
| Polymethyl methacrylate resin (molecular weight 200,000) | 70 parts by weight |
| Compound having general formula (1), in which R = H, X = p-biphenyl methylilene group, m = n = 1 | 150 parts by weight |
| 3,9-Diethyl-3'-carboxymethyl-2,2'-thiacarbocyanine, iodine salt | 0.6 parts by weight |
| Diphenyl iodonium-trifluoromethane sulfonate | 6 parts by weight |
| 1,6-Hexanediol diglycidyl ether | 80 parts by weight |
| Solvent (n-butanol methyl isobutyl ketone = 1:1) | 390 parts by weight |

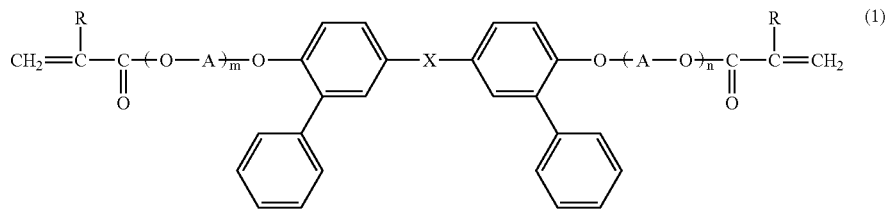

wherein R is hydrogen atom or methyl group, A is ethylene or propylene group, X is p-biphenylmethylilene or fluorenylidene group, m and n are 1 or more, and m+n is a number between 2.0 and 8.0.

On the volume holographic layer formed on the film, a transmission-type volume hologram was recorded in the manner shown in FIG. 8, where a laser beam with a wavelength of 514 nm was used as a reference beam and an object beam, and was then heated at 100° C. for 10 minutes. Specifically, a 500 mm×500 mm frosted glass plate with roughness #1000 was used as a transmission diffuser, and, as shown in FIG. 8, this plate was placed at a point 430 mm apart from the 300 mm×300 mm volume holographic layer so that they faced each other. Light was applied to the transmission diffuser almost vertically to it to produce scattered light, an object beam, on the other side of the transmission diffuser, and this scattered light was made to enter the volume holographic layer. Nearly parallel light was also applied, as a reference beam, to the volume holographic layer at an angle of incidence of approximately 30°. Thereafter, the volume holographic layer was exposed to light from a high-pressure mercury vapor lamp at 3000 mJ/cm$^2$ (converted for 365 nm) to fix the hologram. The diffraction layer (transmission-type volume hologram) formed was of 30° incidence and 0° diffraction, and the diffusion angle at its center portion was ±30°.

The polarized-light selective reflection layer and the rear-side diffraction layer (transmission-type volume hologram) from which the release paper had been removed were sized to 200 mm×200 mm, and were laminated to the respective surfaces of a glass plate of the same size, thereby obtaining a projection screen of Example 1. For lamination, a substrate-less pressure-sensitive adhesive film (manufactured by Panack Co., Ltd., Japan) was used. The projection screen of Example 1 corresponds to the projection screen shown in FIG. 1.

A projection screen of Example 2 was prepared by further laminating a front-side diffraction layer to the projection screen of Example 1. The front-side diffraction layer was formed in the following manner: as shown in FIG. 9, two nearly parallel light were applied, as a reference beam and an object beam, to a volume holographic layer on a film obtained in the same manner as in Example 1 at angle of incidence of 30° and 0°, respectively, to record a transmission-type volume hologram on the volume holographic layer. The front-side diffraction layer has no diffusing properties. This projection screen of Example 2 corresponds to the projection screen shown in FIG. 3. Namely, the front-side diffraction layer was laminated to the front of the polarized-light selective reflection layer so that the angle of incidence of the imaging light entering the front-side diffraction layer from its front did not agree with the angle of diffraction of the front-side diffraction layer, and that the angle of incidence of the imaging light entering the front-side diffraction layer from its rear after being reflected from the polarized-light selective reflection layer agreed with the angle of diffraction of the front-side diffraction layer.

To produce a projection screen of Example 3, a rear-side diffraction layer, a polarized-light selective reflection layer, and a front-side diffraction layer were laminated, as in the production of the projection screen of Example 2. Both the rear-side diffraction layer and the front-side diffraction layer in the projection screen of Example 3 were formed in the same manner as that in which the rear-side diffraction layer of Example 1 was formed. Further, the polarized-light selective reflection layer in the projection screen of Example 3 was formed by the use of a substrate with surfaces to which aligning power had been imparted. With the exception of this point, the same method as that used to form the polarized-light selective reflection layer of Example 1 was employed to form the polarized-light selective reflection layer of Example 3. The cholesteric liquid crystalline structures of the partial selective reflection layers constituting the polarized-light selective reflection layer in the projection screen of Example 3 obtained in the above-described manner were in the state of planar orientation. This projection screen of Example 3 corresponds to the projection screen shown in FIG. 4. Namely, the front-side diffraction layer was laminated to the front of the polarized-light selective reflection layer so that the angle of incidence of the imaging light entering the front-side diffraction layer from its front did not agree with the angle of diffraction of the front-side diffraction layer, and that the angle of incidence of the imaging light entering the front-side diffraction layer from its rear after being reflected from the polarized-light selective reflection layer agreed with the angle of diffraction of the front-side diffraction layer.

To produce a projection screen of Example 4, a rear-side diffraction layer, a polarized-light selective reflection layer, and a front-side diffraction layer were laminated, as in the production of the projection screens of Examples 2 and 3. Both the rear-side diffraction layer and the front-side diffraction layer in the projection screen of Example 4 were formed in the same manner as that in which the rear-side diffraction layer of Example 1 was formed. Further, the polarized-light selective reflection layer in the projection screen of Example 4 was formed in the same manner as that in which the polarized-light selective reflection layer of Example 1 was formed. This projection screen of Example 4 corresponds to the projection screen shown in FIG. 5. Namely, the front-side diffraction layer was laminated to the front of the polarized-light selective reflection layer so that the angle of incidence of the imaging light entering the front-side diffraction layer from its front did not agree with the angle of diffraction of the front-side diffraction layer, and that the angle of incidence of the imaging light entering the front-side diffraction layer from its rear after being reflected from the polarized-light selective reflection layer agreed with the angle of diffraction of the front-side diffraction layer.

A projection system was constructed by combining each projection screen obtained in the above-described manner with a DLP (trademark of Texas Instruments, Inc., USA) projector available from Plus Industry Co., Ltd., Japan. On the aperture of the projector, a circular-polarization-controlling foil was placed in order to convert the imaging light emitted from the projector into circularly polarized light. The circular-polarization-controlling foil was a combination of a right-hand circular polarizer and a left-hand circular polarizer, products of Sumitomo 3M Limited, Japan, where the right-hand circular polarizer and the left-hand circular polarizer were arranged to make up the two equal half sections of the resulting circular member. Moreover, the circular-polarization-controlling foil was provided with a device for rotating the circular-polarization-controlling foil in a plane nearly perpendicular to the direction of emergence of the imaging light.

In the above-described projection system, the projection screen was placed on the floor vertically to it. In addition, the projector and the projection screen were arranged in such a positional relationship that the imaging light from the projector was obliquely incident on the projection screen, in order to make the angle of incidence of the imaging light incident on the rear-side diffraction layer from the CLC screen agree with the angle of diffraction of the rear-side diffraction layer (holographic screen), that is, in order to make the angle of incidence of the imaging light incident on the projection screen 30°.

Under these conditions, the imaging light was projected on the projection screen from the projector, and the images displayed on the projection screen were viewed. In the projection screens 2, 3 and 4, the angle of incidence at which the imaging light was projected on the projection screen from the projector did not agree with the angle of diffraction of the front-side diffraction layer, and the angle of incidence at which the imaging light entered the front-side diffraction layer from its rear after being reflected from the polarized-light selective reflection layer agreed with the angle of diffraction of the front-side diffraction layer.

When the imaging light emitted from the projector was made to pass through the first section of the circular-polarization-controlling foil (the section in which the right-hand circular polarizer was situated), an image was sharply displayed on the projector-side surface of any of the projection screens of Examples 1 to 4. On the other hand, when the imaging light emitted from the projector was made to pass through the second section of the circular-polarization-controlling foil (the section in which the left-hand circular polarizer was situated), an image was sharply displayed on the surface, opposite to the projector-side surface, of any of the projection screens of Examples 1 to 4. Further, when the imaging light emitted from the projector was switched from one image to another at regular intervals (at 1/60-second intervals), and the circular-polarization-controlling foil was rotated in coincidence with the timing of switching of the imaging light, there were sharply displayed, on any of the projection screens of Examples 1 to 4, two different images, one on each side of the screen.

Furthermore, in all of the projection screens of Examples 1 to 4, when the imaging light was not projected on the projection screen, it was possible to clearly see the scene behind the projection screen through it. It was thus confirmed that the projection screens were in a see-through state. Moreover, in all of the projection screens of Examples 1 to 4, even when an image was displayed on the projection screen, it was possible to see the scene behind the projection screen through those portions of the projection screen on which the imaging light was not projected.

In the projection screen of Example 1, the imaging light was diffracted by the rear surface of the projection screen nearly vertically to it, and an image with high contrast was thus displayed on this surface. In the projection screens of Examples 2, 3 and 4, the imaging light was diffracted by both the front surface and the rear surface of the projection screen in a direction nearly vertical to the projection screen, and images with high contrast were thus displayed on these surfaces. When the images displayed on the projector-side surfaces (front side surfaces) of projection screens of Examples 1 to 4 were viewed from the direction perpendicular to each screen, it was found that the images displayed on the projection screens of Examples 2 to 4 were superior to the image displayed on the projection screen of Example 1 in image contrast.

What is claimed is:

1. A transmitting-reflecting projection screen for displaying images on its both sides by reflecting and transmitting imaging light projected, comprising:
   a reflection-type screen that reflects a specific polarized component of imaging light projected, and
   a transmission-type screen that transmits a polarized component of the imaging light having passed through the reflection-type screen without being reflected, the polarized component being different from the specific polarized component, wherein:
   the reflection-type screen comprises a polarized-light selective reflection layer that selectively reflects the specific polarized component;
   the polarized-light selective reflection layer has a cholesteric liquid crystalline structure;
   the transmission-type screen comprises a rear-side diffraction layer that diffracts the light having passed through the reflection-type screen without being reflected;
   the rear-side diffraction layer is formed with a transmission-type volume hologram, and has the function of diffusing light; and
   the transmitting-reflecting projection screen is configured to display the images on its both sides by reflecting and transmitting the imaging light projected.

2. The transmitting-reflecting projection screen according to claim 1, wherein the polarized-light selective reflection layer has the function of diffusing light.

3. The transmitting-reflecting projection screen according to claim 1, wherein the reflection-type screen further comprises a front-side diffraction layer that diffracts the light reflected from the polarized-light selective reflection layer to control the direction in which the light emerges from the projection screen.

4. The transmitting-reflecting projection screen according to claim 3, wherein the front-side diffraction layer is formed with a transmission-type volume hologram.

5. The transmitting-reflecting projection screen according to claim 3, wherein the front-side diffraction layer has the function of diffusing light.

6. The transmitting-reflecting projection screen according to claim 1, wherein the reflection-type screen further comprises a retardation layer that brings a phase shift to light incident on the polarized-light selective reflection layer.

7. The transmitting-reflecting projection screen according to claim 1, wherein the specific polarized component to be reflected on the reflection-type screen is either right- or left-handed circularly polarized light.

8. The transmitting-reflecting projection screen according to claim 1, wherein the specific polarized component to be reflected on the reflection-type screen is one of two types of linearly polarized light.

9. The transmitting-reflecting projection screen according to claim 1, further comprising an absorption polarizer between the reflection-type screen and the transmission-type screen, the absorption polarizer absorbing said specific polarized component to be reflected on the reflection-type screen reflects.

10. The transmitting-reflecting projection screen according to claim 9, wherein the absorption polarizer is a circular polarizer containing a linearly polarizing layer and a retardation layer, and the circular polarizer is placed so that the retardation layer is positioned on the reflection-type screen side.

11. A projection system, comprising:
   the transmitting-reflecting projection screen according to claim 1, and
   an image projection unit that projects imaging light on the transmitting-reflecting projection screen from the reflection-type screen side, wherein the imaging light projected from the image projection unit contains at least either imaging light for reflection including the specific polarized component to be reflected on the reflection-type screen, or imaging light for transmission including polarized component different from said specific polarized component.

12. The projection system according to claim 11, wherein the imaging light for reflection and the imaging light for transmission are light beams that carry identical images.

13. The projection system according to claim 11, wherein the imaging light for reflection and the imaging light for transmission are light beams that carry different images.

14. The projection system according to claim 11, wherein the image projection unit alternately projects the imaging light for reflection and the imaging light for transmission in time-division mode.

* * * * *